US005681991A

United States Patent [19]

Hatfield et al.

[11] Patent Number: 5,681,991

[45] Date of Patent: Oct. 28, 1997

[54] FUEL SYSTEM

[75] Inventors: Laurence Paul Hatfield, East Malling; David Alan Pearce, Gillingham, both of England

[73] Assignee: Lucas Industries public limited company, West Midlands, England

[21] Appl. No.: 660,514

[22] Filed: Jun. 7, 1996

[30] Foreign Application Priority Data

Jun. 13, 1995 [GB] United Kingdom .................... 9511996

[51] Int. Cl.[6] .................................... G01M 15/00

[52] U.S. Cl. .................................. 73/119 A; 364/431.051; 73/115; 73/117.3; 73/118.1

[58] Field of Search .................................. 73/119 A, 115, 73/116, 117.2, 117.3, 118.1; 364/431.051; 340/439

[56] References Cited

U.S. PATENT DOCUMENTS

| | | | |
|---|---|---|---|
| 3,541,847 | 11/1970 | Pisors | 73/119 A |
| 3,748,897 | 7/1973 | Rabinowitz | 73/118.1 |
| 4,094,191 | 6/1978 | Goetsch et al. | 73/118.1 |
| 4,501,140 | 2/1985 | Nakagawa et al. | 73/119 A |
| 4,653,454 | 3/1987 | Konishi et al. | 73/119 A |
| 4,790,277 | 12/1988 | Schechter | 73/119 A |
| 5,020,362 | 6/1991 | Hart et al. | 73/49.7 |
| 5,357,930 | 10/1994 | Fehlmann et al. | 123/449 |
| 5,459,664 | 10/1995 | Buckalew | 73/119 A |

FOREIGN PATENT DOCUMENTS

| | | |
|---|---|---|
| 2110107 | 9/1972 | Germany . |
| 4339957 | 6/1995 | Germany . |
| 2273573 | 6/1994 | United Kingdom . |
| 9119899 | 12/1991 | WIPO . |

*Primary Examiner*—George M. Dombroske
*Attorney, Agent, or Firm*—Trexler, Bushnell, Giangiorgi & Blackstone, Ltd.

[57] ABSTRACT

A method of testing a fuel system of an internal combustion engine comprises measuring the instantaneous speed of a component of a pumping apparatus of the system this speed decreasing as fuel is pressurised to achieve fuel delivery to the engine as compared with the nominal engine speed due to "wind up" in the drive to the engine. The speed profiles obtained as fuel is supplied to each injection nozzle and compared to determine if the injection nozzles are working correctly.

3 Claims, 1 Drawing Sheet

FUEL SYSTEM

This invention relates to a fuel system for an internal combustion engine and of the kind comprising a fuel pumping apparatus having outlets, which are connected to injection nozzles respectively, drive means through which a drive component of said apparatus is driven by the associated engine in timed relationship therewith and the apparatus including means for distributing fuel to the outlets in turn during successive periods of fuel pressurisation within the apparatus.

The fuel injection nozzles deliver fuel to the combustion spaces of the engine respectively and it is desirable that each combustion space should receive the same amount of fuel for a given engine speed and a given fuel demand. There are many factors which can influence the amount of fuel which is supplied through each injection nozzle. For example, one injection nozzle may have a higher opening pressure than the remaining nozzles or one of the nozzles could have a partially blocked outlet orifice or orifices and in both of these cases the combustion space associated with that nozzle will receive less fuel than the remaining combustion spaces.

Alternatively there may be a fault in the pumping apparatus which results in for example a lower fuel delivery from the apparatus to the injection nozzles so that each combustion space of the engine receives less than the demanded fuel.

It is easy to test the fuel system on a test bench since it is possible to measure the volume of fuel which flows through each injection nozzle. It is much more difficult to check the operation of the fuel system when it is installed on an engine and the object of the present invention is to provide a method of testing a fuel system of the kind specified.

According to the invention a method of testing a fuel system of the kind specified comprises measuring the instantaneous speeds of said drive component at angular intervals of rotation of the drive component during the periods of pressurisation of fuel within the apparatus and comparing the speed profiles obtained with each other or with a predetermined speed profile.

According to a further feature of the invention the instantaneous speeds are compared with an average speed over one pumping cycle to provide a speed disturbance profile, integrating the speed disturbance profile over a predetermined angular movement of the drive component and multiplying the speed disturbance integral by a non-linear function to provide an indication of the work done on the fuel during the period of fuel pressurisation in the pumping cycle.

Figure 1:
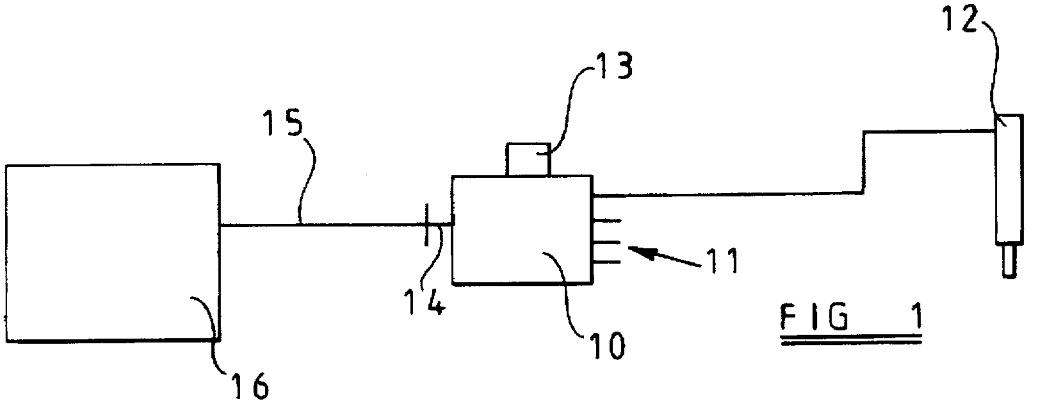
Figure 2:
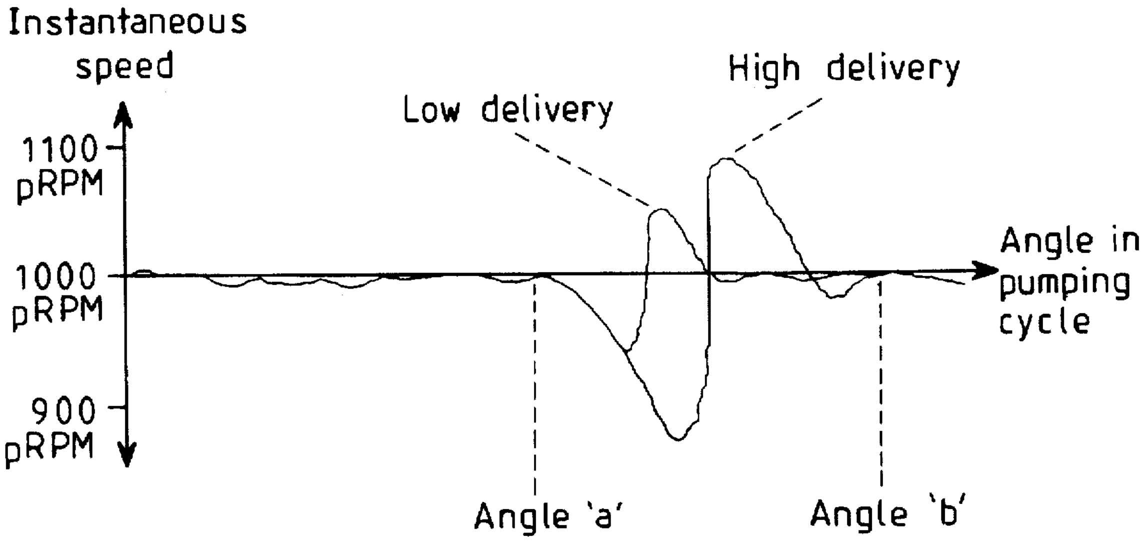

An example of the method in accordance with the invention will now be described with reference to the accompanying drawings in which:

FIG. 1 is a diagrammatic representation of one example of a fuel system for supplying fuel to a compression ignition engine, and FIG. 2 is a graph showing the variation of speed of a driving component of the apparatus over a cycle of operation thereof.

Referring to FIG. 1 of the drawings the fuel system comprises a fuel pumping apparatus 10 having a plurality of outlets 11 which are connected to injection nozzles 12 respectively only one of which is shown. The fuel pumping apparatus is provided with a fuel control member 13 which can be operated to control the amount of fuel which is delivered to the injection nozzles.

The apparatus is also provided with a drive shaft 14 which is coupled by a drive means 15 to a rotary part of the associated engine 16. The drive means 15 may be in the form of a toothed drive belt which is engaged about a toothed wheel driven by the engine and about a further toothed wheel which is mounted on the drive shaft 14.

The pumping apparatus 10 may be of the rotary distributor type in which a pair or pairs of plungers is/are mounted in bores formed in a rotary distributor member, the plungers being driven inwardly by the action of cam lobes formed on the internal peripheral surface of a cam ring which is mounted in the housing of the apparatus. The distributor member has a delivery passage which communicates in turn with the outlets 11 during successive inward movements of the pumping plungers. The fuel control member 13 may be an electromagnetically operated spill valve which allows fuel to spill from the inner ends of the bores containing the pumping plungers thereby to control the amount of fuel which is supplied to the outlets. Alternatively the fuel control member 13 may be a simple valve which at the appropriate time is actuated to open a separate spill valve. The operation of the fuel control member will be under the control of an electronic control system which is responsive to various actual and desired engine operating parameters.

In operation, as the plungers start to move inwardly with the spill valve closed, the fuel in the various passages within the distributor member and in one of the outlets 11 together with the fuel line connecting that outlet with its injection nozzle 12, will be pressurised and when the nozzle opening pressure is attained the valve member within the nozzle will open to permit fuel flow to the associated engine combustion space. Although fuel delivery is taking place the pressure within the apparatus will continue to rise until the spill valve is opened whereupon the pressure decays and the valve in the fuel injection nozzle closes. The process is repeated after the bores have been refilled with fuel, for the injection nozzles in turn.

During pressurisation of the fuel a substantial torque is required to rotate the drive shaft and this torque increases as the fuel pressure increases. The result is that "wind up" takes place in the drive to the drive shaft 14 and possibly in the portion of the drive shaft within the pump housing which is connected to a drive component or member for the cam followers associated with the plungers. The "wind up" results in the instantaneous speed of the drive member falling as compared with the speed of the engine. When the spill valve is opened the pressure decays very quickly and the energy stored in the drive means is released and this results in acceleration of the drive member so that it is possible for the instantaneous value of its speed to exceed that of the engine. Finally the instantaneous speed settles down to that of the engine. This is illustrated in FIG. 2 where the apparatus is being driven at a nominal 1000 rpm by the engine and the instantaneous speed drops to slightly below 900 rpm when a high delivery of fuel is taking place and rises to slightly below 1100 rpm after the spill valve has been opened. It will be noted that there is a small degree of overshoot before the speed of the drive member settles to the engine speed. Where a reduced quantity of fuel is being supplied to the engine then the speed excursion is less as shown by the lower amplitude curve in FIG. 2.

The instantaneous speed is measured using a high resolution speed and angular position sensor mounted within the fuel pumping apparatus and the signal from the sensor can be used to provide the curves shown in FIG. 2.

If the apparatus is functioning correctly and if the associated injection nozzles are set correctly and themselves are functioning correctly the fluctuations in speed registered should be the same when fuel is delivered to each injection nozzle. If for example one injection nozzle has a higher opening pressure then the pressure rise during the period of closure of the spill valve will be higher and it can therefore be expected that the instantaneous speed while the cam followers are traversing the leading flanks of the cam lobes, will be lower. It is therefore possible to compare the instantaneous speed profiles to determine whether the injection nozzles are functioning in a similar manner. It is also possible to compare the profiles with a test profile.

It is preferred however to use an integration technique. The area below the axis represents when multiplied by a non-linear function, the work done in pressurising the fuel and in "winding up" the drive means. The area above the axis represents the release of the work done previously in "winding up" the drive means (the potential energy due to the "winding up" of the drive means). If therefore integration takes place between the limits (a) and (b) this represents when multiplied by the aforesaid nonlinear function, the work done in pressurising the fuel to achieve fuel delivery. The values of work done can then be compared to determine whether each injection nozzle is functioning in a substantially identical manner and in addition may be compared with a stored value appropriate to the speed and fuel demand, to determine if the apparatus is functioning correctly. If it is determined that one injection nozzle is delivering more or less fuel than the remaining nozzles then the instant of spillage of fuel may be adjusted for that nozzle. In like manner the overall output of the apparatus may be adjusted to alter the fuel delivered by all the nozzles.

The limits (a) and (b) are chosen to embrace the full range of fuel delivery by the apparatus. The aforesaid non-linear function is empirically derived for each engine application from maps held in the control system. The function value will depend upon a number of factors such for example as the stiffness of the aforesaid drive means and the hydraulic specification of the pumping apparatus.

As described the pumping apparatus is of the electrically controlled spill type. The invention is equally applicable to mechanically controlled spill type pumping apparatus and to pumping apparatus in which delivery of fuel terminates as the cam followers move over the crests of the cam lobes. In this case it may be more convenient to take into account only the work done in pressurising and displacing the fuel since the rate of energy recovery will be to an extent controlled by the profiles of the trailing flanks of the cam lobes.

We claim:

1. A method of testing a fuel system for an internal combustion engine, the fuel system including a fuel pumping apparatus having outlets which are connected to fuel injection nozzles respectively, drive means through which a drive component of the apparatus is driven by the engine in timed relationship therewith, the fuel pumping apparatus including means for distributing fuel to the outlets in turn during successive periods of fuel pressurization within the apparatus, the method comprising:

measuring the instantaneous speeds of said drive component during the periods of pressurization of fuel within the apparatus; and comparing the speed profiles with each other or with a predetermined speed profile.

2. A method of testing a fuel system for an internal combustion engine, the fuel system including a fuel pumping apparatus having outlets which are connected to fuel injection nozzles respectively, drive means through which a drive component of the apparatus is driven by the engine in timed relationship therewith, the fuel pumping apparatus including means for distributing fuel to the outlets in turn during successive periods of fuel pressurization within the apparatus, the method comprising:

measuring the instantaneous speeds of said drive component over one pumping cycle;

comparing the instantaneous speeds with the average engine speed over one pumping cycle to provide a speed disturbance profile;

integrating the speed disturbance profile over a predetermined angular movement of the component;

multiplying the speed disturbance integral by a non-linear function to provide an indication of work done on the fuel during the period of fuel pressurization in the pumping cycle.

3. A method according to claim 2, including the further step of comparing the values of work done in pressurising the fuel for each injection nozzle with each other or with a stored value.

* * * * *